United States Patent [19]

Fitts

[11] 4,133,004
[45] Jan. 2, 1979

[54] VIDEO CORRELATION TRACKER
[75] Inventor: John M. Fitts, Santa Monica, Calif.
[73] Assignee: Hughes Aircraft Company, Culver City, Calif.
[21] Appl. No.: 847,866
[22] Filed: Nov. 2, 1977
[51] Int. Cl.$^2$ ............................................. H04N 3/00
[52] U.S. Cl. .................................. 358/125; 358/126; 244/3.16; 250/203 R
[58] Field of Search ................ 358/125, 126; 244/3.16, 244/3.15; 250/203 R, 203 CT

[56] References Cited

U.S. PATENT DOCUMENTS

| | | | |
|---|---|---|---|
| 3,923,273 | 12/1975 | Alplers | 358/125 |
| 3,943,277 | 3/1976 | Everly et al. | 358/125 |

Primary Examiner—Robert L. Richardson
Assistant Examiner—Edward L. Coles
Attorney, Agent, or Firm—Lawrence V. Link, Jr.; W. H. MacAllister

[57] ABSTRACT

A correlation tracker for generating correlation error tracking signals over an entire video frame. Video information from a scanning receiver is inputted into the correlation tracker in serial form. The correlation tracker first incorporates apparatus to generate a reference map in pixel format. Reference map pixel information for one video frame plus one video line is stored in a memory to allow the calculation of azimuth and elevation optimal weighting values for each pixel in the field of view. Each video pixel of data being received during the current frame is then summed with the corresponding reference map pixel from the prior frame and the result multiplied by the appropriate weighting function. Each resultant product is then combined in an accumulator to form azimuth and elevation correlation error signals which are composite indications of the frame-to-frame correlation over the entire field of view. The weighting factors for each pixel are also combined and accumulatively added over the entire image plane to form three adaptive scale factors at the end of each frame which are combined with the azimuth and elevation correlation error signals to eliminate cross-coupling and generate cross-coupling-free correlation error signals. Drift compensation may also be provided by combining the adaptive scale factors and several predetermined constants to recursively calculate a drift correction which when combined with the cross-coupling-free correlation error signals generates drift-free correlation error signals.

27 Claims, 6 Drawing Figures

VIDEO CORRELATION TRACKER

BACKGROUND OF THE INVENTION

The present invention relates to trackers and particularly to correlation trackers whereby correlation error signals are generated which are indicative of the frame-to-frame correlation of a particular scanned scene.

In general, the correlation tracking concept involves the generation of a cross-correlation function between a stored scene and currently measured scene in which the location of the peak is a measure of the image shift (i.e. the tracking errors). However, if such an approach is followed literally, the operation of systems in which the field of view (FOV) is sampled could be seriously impaired because the correlation between a reference map (preferably generated from an averaging of past sample scenes) and a currently sampled scene will always result in a signal with its peak occurring at discrete values of the resolution elements (i.e. pixels) in the FOV. Clearly, if tracking accuracies several orders of magnitude less than the resolution capability are required, inferior tracking could result using a correlation tracker that relies on correlation peak information.

Conventional methods for obtaining elevation and azimuth tracking error signals ($\delta e$ and $\delta d$ respectively) from video data include edge tracking and centroid tracking processes. In the case of a centroid tracker for example, azimuth and elevation weighting functions are essentially stored ramp signals. In order to limit background noise levels, a gating control is often provided to truncate the weighting functions to zero outside the field of view of the gate. Threshold circuits can also reduce the effect of background noise. Attempts are often made to select the gate sizes and threshold levels automatically in order to give an adaptive capability to the tracking system. However, even if such a selection could be done in some optimal fashion, it can be shown that the correlation tracker of the present invention will always yield less noisy tracking error signals. Consequently, the advantages of the correlation tracker of the present invention become most apparent for low signal-to-noise ratios (SNR), i.e., SNR's less than ten, for example.

Systems have also been implemented to perform a correlation tracking function through the use of optics, photographic transparencies, etc. However, such systems have limited flexibility for changing targets. Suggestions have also been promulgated supporting the utilization of digital processing techniques. However, the primary reason that such digital processing has not been developed for a correlation tracker operation has been the inability to efficiently process and use the resultant large amounts of video data. Furthermore, the data rates are often too fast for digital computers to be used in a real time operation.

The video correlation tracker of the present invention circumvents these significant problems in making efficient use of large amounts of data by generating and utilizing near optimal adaptive weighting functions. In theory, it has been demonstrated that the correlation tracker of the present invention has the capability of responding to targets with changing sizes and aspect angles for bandwidths less than $\omega_1 \equiv w_1/T$, where T is the frame time for the field of view and $w_1$ is the weighting parameter for the current scene in a reference map averaging process.

SUMMARY OF THE INVENTION

A frame of video from a TV-like imaging sensor and multiplexer occurs at time increments which may be denoted as 1, 2, ... k, k + 1 ... where the time interval to scan a frame of video, T, is typically 1/60 of a second. Each frame of video then contains an image which after digitization consists of an array of pixels (or resolution elements) which number Ne in elevation (vertical) and Nd in azimuth (horizontal). Typically Ne and Nd each have values of several hundred so that the total array contains on the order of $10^4$ to $10^5$ pixels. A pixel at the i,j position in the array (i = vertical, J = horizontal) is represented by a voltage or intensity level of $V_{ij}(k)$ for frame k. At the end of each video frame, the optimal (least noise) correlation tracking signals for the vertical and horizontal directions can be determined from $V_{ij}(k)$ utilizing apparatus in accordance with the principles of the present invention.

Thus, a correlation tracker for generating correlation tracking error signals is first characterized as having a receiver for receiving radar, infrared or other electromagnetic energy from an observed scene to form a plurality of video signals $V_{ij}(k)$ which may be combined in serial form to sequentially energize individual pixels in the image plane of a display to thereby generate a video frame of the observed FOV scene. This serial video signal is converted to a digital format in an A/D converter in the preferred embodiment.

The video information is then first used to form a stored reference map having a plurality of pixels each representing some functional average of the corresponding video pixels from a plurality of previously generated FOV frames. Inherent in this reference map generator is a memory capable of storing at least one frame plus one line of the immediately preceding reference map pixels.

A weighting function generator is then coupled to the map generator in order to generate both an elevation and azimuth weighting function value for each reference map pixel. These weighting functions are essentially derivatives of the signal value for each pixel in orthogonal directions. Consequently, the derivatives may be generated by simply differencing the signal value of adjacent pixels on either side of the pixel in question in the direction for which the derivative is sought and dividing by the physical length over which the derivative is taken.

A scale factor generator is also provided to receive the weighting functions and generate adaptive scale factors which are the negative of the second derivative of the crosscorrelation function in and between the coordinate directions of the observation scene video and the reference map.

A correlation error generator is next coupled to receive the weighting functions and the corresponding pixel values of the reference map and current video pixel data to form a preliminary correlation error value in both the azimuth and elevation direction for each pixel. These preliminary correlation error values are summed during the frame scan time over the total number of pixels (i.e., Ne × Nd pixels) and the result divided by the appropriate adaptive scale factor to generate an azimuth correlation error value and elevation correlation error value for each video frame by the end of the video frame. These error values are outputted at the end of each video frame, preferably during the frame retrace time before the video data for the next frame commences to be received.

A normalized error value generator may also be provided to couple the adaptive scale factors and the correlation error signals to form an azimuth normalized error value and an elevation normalized error value free of cross-coupling.

Because operation of the present invention will generally not be for the ideal reference map case causing the normalized error values to include errors due to drift, a drift compensator is coupled to the output of the normalized error signal generator whereby drift compensation values are recursively calculated and summed to the normalized error values in such a way to generate the desired drift-free correlation tracker error signal for both elevation and azimuth.

It is thus one object of the present invention to provide a correlation tracker.

It is another object of the present invention to provide a correlation tracker which provides tracking error signals having substantially reduced noise corruption.

It is still another object of the present invention to provide a correlation tracker which can make efficient use of a large amount of video data.

Still another object of the present invention is to provide a correlation tracker whereby optimal adaptive weighting functions are generated and utilized.

Yet another object of the present invention is to provide a greatly simplified correlation tracker.

BRIEF DESCRIPTION OF THE DRAWINGS

These and other objects, features and advantages of the invention as well as the invention itself will become more apparent to those skilled in the art in light of the following detailed description taken in consideration with the accompanying drawings where like reference numerals indicate like or corresponding parts throughout the several views wherein:

FIG. 1b is a representation of a typical video signal having a plurality of segments each representing the signal value utilized to energize one pixel in the pixel array illustrated in FIG. 1a.

DETAILED DESCRIPTION OF THE PREFERRED EMBODIMENTS

The correlation tracker apparatus and method of the present invention is particularly applicable in systems such as television, certain radar systems, or infrared imaging systems in which the FOV (field-of-view) is scanned and data therefrom is encoded into a video signal format. The resultant video signal may be ultimately used to sequentially energize a plurality of pixels in an image plane of a display viewed by an operator. In an infrared system, for example, a finite array of infrared detectors may be positioned in a single vertical row which is swept across the FOV. The output from the plurality of infrared detectors may be periodically sampled and then multiplexed to produce a single composite video signal which is comprised of a series of sequential samples each representing the magnitude of the infrared electromagnetic radiation from a small region in the FOV. An example of such a receiving technique incorporating sampling and multiplexing is illustrated in pending application Ser. No. 841,581, filed Oct. 13, 1977. In another type of infrared system a storing array of sensors receive data from the FOV and the data may be periodically multiplexed into a series of video signals.

Figure 1A:
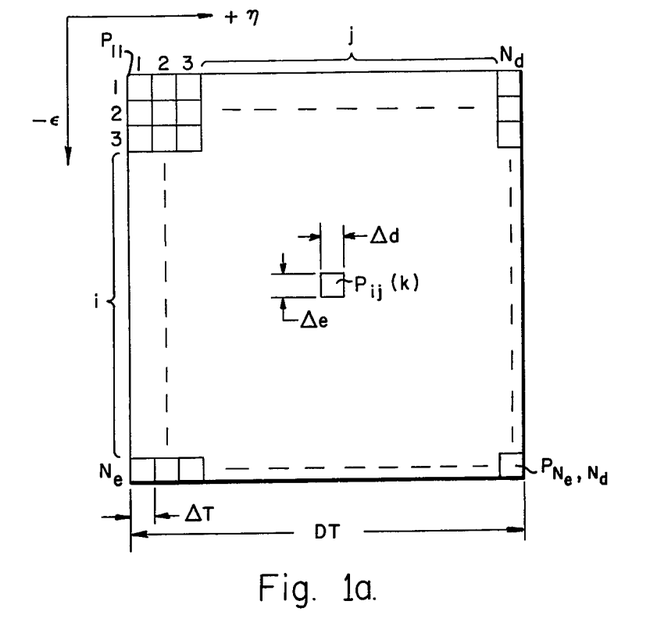
FIG. 1a is a representation of an image plane for the display of imaging sensor video in pixel array format.

A representative image plane in pixel array format having an elevation coordinate $\epsilon$ and azimuth coordinate $\eta$ is illustrated in FIG. 1a. It will be understood that the image plane described represents the organization for both the video signal $V_{ij}(k)$ and the reference map memory as well as the image plane of an actual display 205. However, the reference map pixel data stored need not be actually displayed. It will also be appreciated that the pixel dimensions hereafter described are for a given actual display image plane. Each pixel $P_{ij}(k)$ of a representative display image plane is energized once during each frame k by the corresponding appropriate video signal $V_{ij}(k)$. The speed at which the individual pixels are energized and the presistence qualities of the pixels once energized can be utilized to permit a frame of video to be displayed. For purposes of explanation hereafter, the image plane will be understood to have Ne rows of pixels and Nd columns of pixels where each pixel has a physical dimension $\Delta e$ in the $\epsilon$ coordinate direction and a physical dimension $\Delta d$ in the $\eta$ coordinate direction. Each pixel is then energized for $\Delta T$ seconds with a row of pixels (i.e. Nd pixels) being energized in DT seconds. Furthermore, the scanning convention adopted for the explanation of the present invention will be to energize each pixel of the image plane individually in the horizontal direction along coordinate $\eta$ with each row being sequentially energized in the negative $\epsilon$ coordinate direction. Thus, from FIG. 1a, pixel $P_{11}$ will be energized first, pixel $P_{12}$ will be energized second and so forth until pixel $P_{Ne,Nd}$ is energized last. Of course, it will be appreciated that any scanning pattern of the receiver and any image plane energizing sequence may be implemented without departing from the present invention so long as the sequence of energizing the image plane pixel array is known. Further, it will be obvious to those skilled in the art that variations in the scanning pattern may require appropriate sign changes in various terms of the hereafter described equations.

Figure 1B:
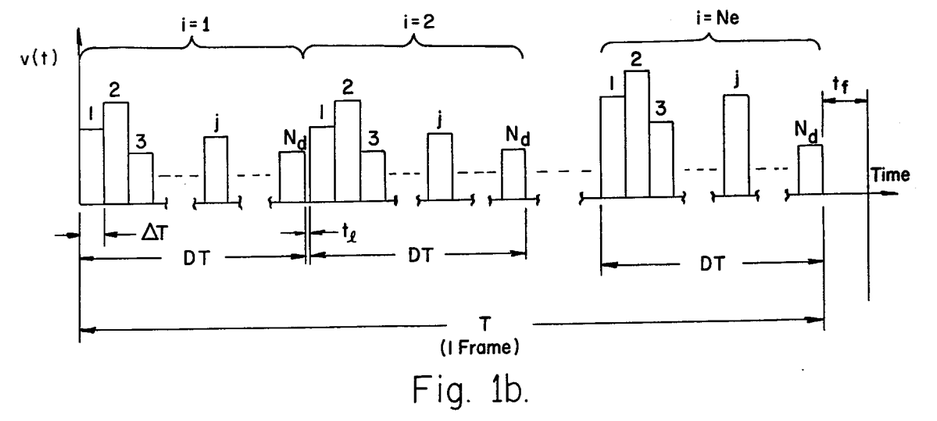

Referring now to FIG. 1b, a representative video signal v(t) is shown having a plurality of components $V_{ij}(k)$ each with a magnitude proportional to the intensity of the electromagnetic radiation received by the system sensors in the receiver scanning process. The video signal v(t) is organized in accordance with the previously described image plane pixel array organization to thereby allow the video signal v(t) to energize the display image plane illustrated in FIG. 1a. Thus, each video signal component $V_{ij}$ persists for a time $\Delta T$ with the time necessary to energize an entire row of pixels designated as DT. In addition, between energizing pixel $P_{i,Nd}$ and pixel $P_{i+1,1}$ a line retrace time, $t_l$, is required to allow the scanning beam of the display to be repositioned to the beginning of the next line. Such a line retrace time $t_l$ occurs at the end of the scan time for each row and continues until the end of the frame writing time T at which time a frame retrace time $t_f$ is required to allows the scanning beam of the display to return to pixel $P_{11}$ from pixel $P_{Ne,ND}$. In general, the frame retrace time will be somewhat longer than the line retrace time. Of course, it will be appreciated that various scanning techniques may be utilized to minimize the line retrace time or the frame retrace time without departing from the teaching of the present invention. Once frame k has been generated on the image plane and the frame retrace time has occurred, the next image plane frame k+1 is written on the display image plane by repeating the process previously described.

As indicated above, it is essential in many systems to provide a high degree of stability for the display from frame to frame to not only prevent display jitter and other such abnormalities but to permit the location of features in the image plane to an accuracy greater than the size of the individual pixels. The generation of error signals which may be utilized in a feedback configuration is one way to provide these characteristics.

Figure 2A:
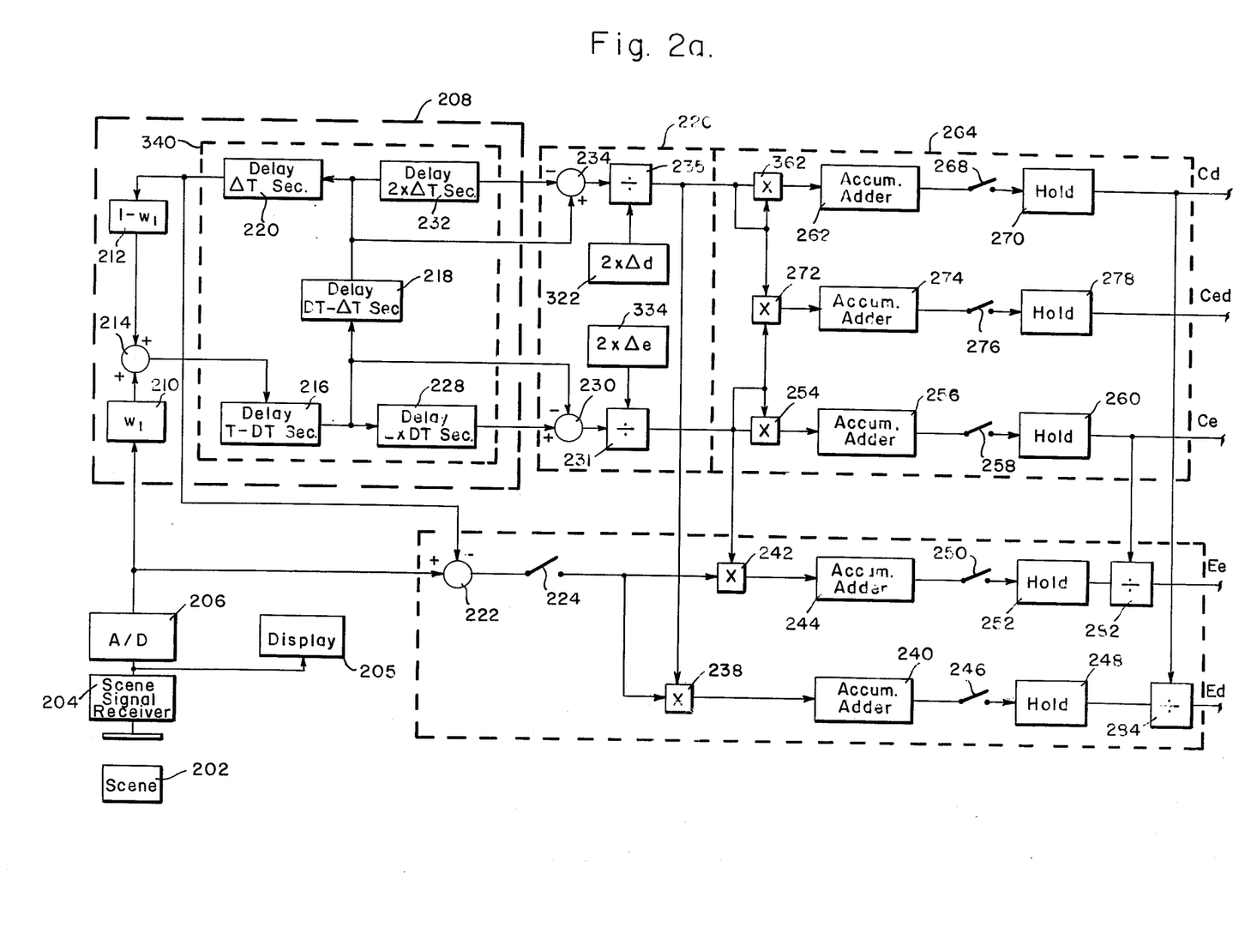
FIGS. 2a and 2b illustrate a detailed block diagram of a correlation tracker in accordance with the present invention.
Figure 2B:
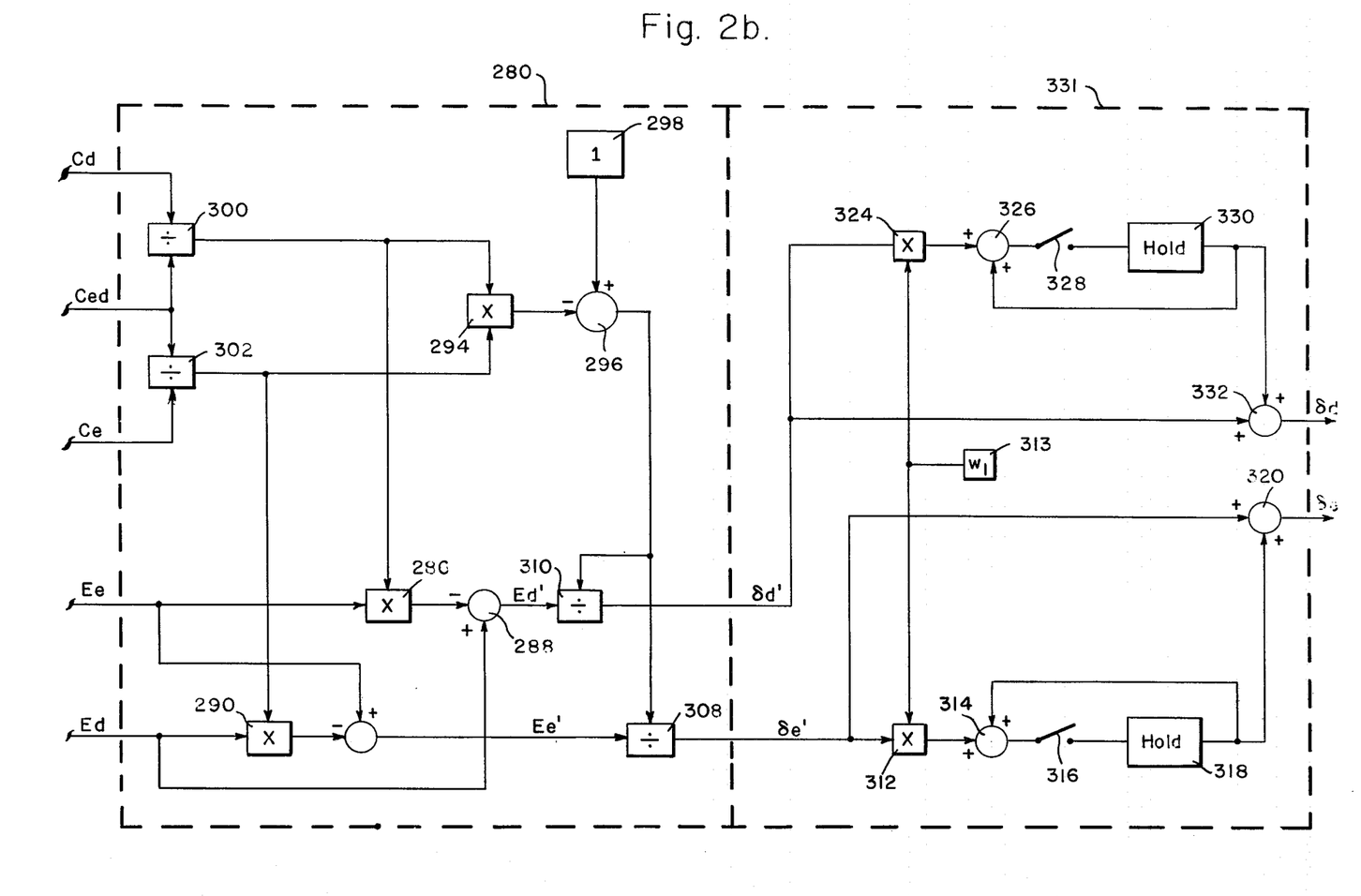

Referring now to FIGS. 2a and 2b, a representative correlation tracker 200 in accordance with the teachings of the present invention is illustrated. Initially, a FOV scene 202 is scanned by a scene signal receiver 204 which may be a radar receiver, an infrared receiver or any electromagnetic signal receiver. The receiver 204 senses electromagnetic radiation from the FOV scene 202 and generates a video signal v(t) according to a particular format such as the format of the video signal illustrated in FIG. 1b. In the preferred digital embodiment of the present invention, the individual components of the video signal $V_{ij}$ are first converted to a digital number representation in an A to D converter 206 to form a digitized video signal v(t) comprised of a stream of digital numbers $V_{ij}(k)$ for each frame k of a display image plane.

In accordance with the preferred embodiment of the present invention, a reference map is first generated according to the relation $$MAP_{ij}(k) = (1-w_1) MAP_{ij}(k-1) + w_1 V_{ij}(k)$$

where $w_1$ is a reference map weighting function having a value $0 \leq w_1 \leq 1$ and where $w_1$ is preferably chosen as the reciprocal of the number of frames of video information over which the generated reference map pixel values are determined. Consequently, if features in the map are changing rapidly, it will be desirable to decrease the number of frames which contribute to the value of the elements of the reference map by increasing the defined value of $w_1$. Conversely, if little movement or change is expected in the video received, then the inclusion of more frames of video information to form the reference map will be desirable and the defined value of $w_1$ will thus be decreased. In addition, it is also desirable to include the maximum number of video frames (i.e., to set $w_1$ as low as possible) in order to minimize the effect of any random noise which may exist in the video return. As an example, in relatively benign video scenes, acceptable results have been achieved utilizing 12 to 16 video frames (i.e. setting $w_1$ = 0.06 − 0.08) while for dynamic video scenes successful results have been achieved utilizing about 5 video frames (i.e. setting $w_1 = 0.2$). It may also be desirable to periodically reset the value of $w_1$ during operation of the tracker to more accurately reflect the dynamics of a FOV while it is being observed.

Because the reference map for any given frame k is dependent on both the current data $V_{ij}(k)$ and the value of the reference map $MAP_{ij}(k-1)$ for the previous video frame $k-1$, it is necessary in the preferred embodiment to provide some means of storing at least one frame of $MAP_{ij}$ data. This storage is preferably done according an organization directly analogous to the organization of the display image plane. Although it is preferable to compute the reference map according to this technique, it will be appreciated that a constant reference map may be defined or an open loop method may be employed without departing from the teachings of the present invention so long as a reference map is provided which is representative of the previously received video signals.

Referring now principally to FIG. 2a, a map generator 208 is illustrated whereby video information $V_{ij}(k)$ for each pixel $P_{ij}(k)$ is first multiplied in a $w_1$ multiplier 210 to obtain the product $w_1 * V_{ij}(k)$. This product is then added to the corresponding map pixel value $MAP_{ij}(k-1)$ which has been stored from the calculations in the previous video frame and multiplied in a second multiplier 212 by $1-w_1$. The two above-described products are then summed in a first summer 214 to yield a series of reference map pixel values having the same output format as the digitized video input $V_{ij}(k)$.

The resultant map $MAP_{ij}(k)$ for frame K is then stored. This storage may be accomplished using a random access memory 340 (represented as a dashed line about the next to be described shift register embodiment) or a plurality of shift registers or any other storage technique whereby at least one frame plus one line of digitized map pixel data can be stored. In FIG. 2a, an implementation is shown utilizing a series of shift registers capable of storing and shifting multi-bit digitized values of $MAP_{ij}(k)$. Thus, each value of $MAP_{ij}(k)$ is stored as a digital word in a first bit region of a first shift register 216 through which shifting occurs to accomplish a delay approximately equal to T-DT (i.e., capable of storing and serially shifting (Ne−1) x Nd words of $MAP_{ij}$ pixel data). As each delayed value of the map occurs in the last bit region of the first shift register 216, it is input into a second shift register 218 would delays each pixel value of $MAP_{ij}$ for a time approximately equal to DT-ΔT seconds by a shifting process identical to that of the first shift register 216. In order to accomplish a shift delay for this length of time, the second shift register 218 must have Nd − 1 reference map pixel word storage locations. Finally, the resultant map, delayed exactly one video frame, is obtained by incorporating a third shift register 220 which delays each map pixel word by a time ΔT. The third pixel word shift register thus stores only one map pixel word.

Although reference has not been made to the inclusion of the line retrace time $t_l$ or the frame retrace time $t_f$ in the above-mentioned delay process, it will be appreciated that if the shifting in the various shift registers 216, 218 and 220 occurs in response to a clock which occurs only when each new digital video word $V_{ij}$ is outputted from the A to D converter 206, the additional retrace times will be inherently included.

In accordance with the above description, if $MAP_{ij}(k)$ data is being input to the first register, then $MAP_{i-1,j}(k-1)$ data will be output from the first shift register 216 and input to the second shift register 218 while the output of the second register 218 will be $MAP_{i,j-1}(k-1)$ data and the output of the third shift register 220 will be $MAP_{ij}(k-1)$.

In order to begin the recursive computation of $MAP_{ij}$, it is necessary to define a value for the initial MAP$_{ij}$(0). This initial map may be generated in a number of ways. For example, the initial frame of video information may be defined as the initial value of the map, i.e., MAP$_{ij}$(0) = Y$_{ij}$(0) with tracking commencing with the next frame of video information defined to be frame $k=1$. This method can be implemented by simply inhibiting the computation of error values during the initial frame, $k=0$, of video utilizing a switch apparatus 224, for example, after a second summer 222. Alternatively, initial MAP$_{ij}$(0) may be generated by operating the recursive map generator 208 with the first several frames of video information before beginning to compute correlation tracker error signals utilizing the remainder of the apparatus. Such an initialization technique may be implemented by incorporating a swich 224 at the series of AND gates (not shown) having an enable signal which enables the output from summer 222, is then enabled or closed at a later time which may, for example, be any time greater than $k=1$ i.e., after the first frame of video is received. This initialization technique may be described by the equation $$MAP_{ij}(k) = (1-w_1) MAP_{ij}(k-1) + w_1 V_{ij}(k)$$

for $k=1$ to $k = 1/w_1$. When $k = 1/N_1$, switch 224 then closes to enable the remainder of the system to operate. Various other initialization techniques may also be utilized without departing from the teachings of the present invention.

The reference map generator 208 also incorporates a fourth shift register 228 coupled to the output of the first shift register 216. The fourth shift register 228 is comprised of 2 × Nd reference map pixel word storage locations so that the pixel data word input to the fourth shift register 228 will be delayed approximately 2 × DT seconds. Consequently, the output of the fourth delay shift register 228 will be MAP$_{i+1,j}$(k−1) when the output of the first shift register 216 has the value for MAP$_{i-1,j}$(k−1) and the input video data is V$_{ij}$(k).

Finally, the reference map generator includes a fifth shift register delay 232 having two reference map pixel word storage locations coupled to the output of the second shift register 218 to delay the output of the second shift register 218 by an amount substantially equal to 2 × ΔT seconds and thereby provide the digital value of MAP$_{i,j+1}$(k−1) at the same time that the second shift register 218 has the value for MAP$_{i,j-1}$(k−1) at its output.

The output of the first, second, fourth and fifth shift registers 216, 218, 228 and 232 respectively are then inputted to a weighting function generator 226 which generates approximations to the negative derivatives at each pixel location in orthogonal directions along coordinates ε and η respectively. Such derivative approximations may be computed according to the relations $$We_{ij}(k) = \frac{MAP_{i+1,j}(k-1) - MAP_{i-1,j}(k-1)}{2\Delta e}$$

$$Wd_{ij}(k) = \frac{-MAP_{i,j+1}(k-1) + MAP_{i,j-1}(k-1)}{2\Delta d}$$

where Δd and Δe are the physical dimensions of each pixel of the image plane utilized in the azimuth and elevation directions respectively.

The term MAP$_{i-1,j}$(k−1) is always available at the output of the first shift register 216. Similarly, MAP$_{i,j-1}$(k−1) is always available at the output of the second shift register 218, MAP$_{i+1,j}$(k−1) is always available at the output of the fourth delay shift register 228 and MAP$_{i,j+1}$(k−1) is always available at the output of the fifth delay shift register 232. The digital value at the output of the first shift register 216 may then be subtracted from the digital value at the output of the fourth shift register 228 in a third summer 230. The output of the third summer is coupled to the dividend input of a first weighting function divider 231 whose division input is coupled to a ROM or other storage means 334 where the constant 2*Δe is stored to thereby generate the weighting function We$_{ij}$(k) at the output of the divider 234.

Similarly, the derivative approximation Wd$_{ij}$(k) along the η coordinate may be generated by subtracting the output of the second shift register 218 from the output of the fifth shift register 232 in a fourth summer 234 whose output is coupled to the dividend input of a second weighting function divider 235. The divisor input of the second divider 231 is coupled to a second ROM or other storage means 322 where the constant 2*Δd is stored to thereby generate the weighting function Wd$_{ij}$(k) at the output of the divider 235.

If the derivatives of a pixel along an edge of the pixel array are required, it will be recognized that the next adjacent pixel may not exist, thus preventing the generation of W$_e$ and W$_d$ for those pixels in the above way. This problem may be solved in several ways. For example, the pixel array used for tracking in accordance with the present invention may be shrunk by two pixels in azimuth and elevation to provide a one pixel wide "border". Thus, correlation tracking will occur over the pixel array P$_{2,j}$ to P$_{(Ne-1),j}$ in elevation and P$_{i,2}$ to P$_{i,(Nd-1)}$ in azimuth. Alternatively, since consistency rather than accuracy is the desired quality along the edges, the entire array may be utilized with each required "pixel" for which data is not available set to zero. Thus, V$_{o,j}$ = V$_{Ne+1,j}$ = 0 for all j and V$_{i,0}$ = V$_{i,Nd+1}$ = 0 for all i.

In accordance with the present invention, initial correlation error signals Ee(k) + Ed(k) are generated in a correlation error signal generator 236 in accordance with the relationships $$Ee^*(k) = \sum_{i=1}^{Ne} \sum_{j=1}^{Nd} We_{ij}(k) [V_{ij}(k) - MAP_{ij}(k-1)]$$

$$Ee(k) = \frac{Ee^*(k)}{Ce(k)}$$

$$N Ed^*(k) = \sum_{i=1}^{Ne} \sum_{j=1}^{Nd} Wd_{ij}(k) [V_{ij}(k) - MAP_{ij}(k-1)]$$

$$Ed(k) = \frac{Ed^*(k)}{Cd(k)}$$

where Ce(k) and Cd(k) are adaptive scale factors from a scale factor generator 264 to be described subsequently. Thus, the coupled correlation error signals Ee(k) and Ed(k) for frame k represent the weighted difference between the digitized video signal and the corresponding reference map for each pixel with the weighed difference summed over all pixels i n the image plane and divided by an appropriate adaptive scale factor.

In order to generate the error value V$_{ij}$(k)−MAP$_{ij}$(k−1) for each pixel, the output of the third shift register 220 representing MAP$_{ij}$(k−1) is subtracted from the current video signal V$_{ij}$(k) in the second summer 222. The result for pixel P$_{ij}$ is then multiplied in a third multiplier 238 (when the switch 224 previously described is closed) by weighting function $Wd_{ij}(k)$ from the second divider 235 with the resultant output $Wd_{ij}(k) [V_{ij}(k) - MAP_{ij}(k-1)]$ coupled to a first accumulative adder 240.

The output of the second summer 222 is also coupled through the switch 224 to one input of a fourth multiplier 242 whose second input is coupled to the output of the first divider 231 where weighting function $We_{ij}(k)$ is available so that the product $We_{ij}(k) [V_{ij}(k) - MAP_{ij}(k)]$ is generated at the output of the fourth multiplier 242. This fourth multiplier output is coupled to a second accumulative adder 244. The outputs for each pixel generated by the third and fourth multipliers 238 and 242, are summed over all Ne × Nd pixel elements for an entire video frame in the first and second accumulative adders 240 and 244 respectively.

At the end of the video frame and preferably during the frame retrace time $t_f$ (see FIG. 1a), a first switching apparatus 246 coupled to the first accumulative adder 240 is closed to transfer the accumulated value Ed* (k) to a hold register 248. At the same time, a second switch apparatus 250 is coupled to the second accumulative adder 244 to transfer the accumulated value in the second accumulative adder 244 to a second hold register 252. Thus, the value transferred to the first hold register 248 during the frame retrace time is the value Ed* (k) accumulated during the time that frame k was being formed and the value transferred to the second hold register 252 during the frame retrace time is the value Ee* (k) accumulated during the time that frame k was being formed.

The output from the hold register 248 is next coupled to the dividend input of a third divider 284 whose divisor input is coupled to the Cd(k) output of the scale factor generator 264 to thereby generate an azimuth error value Ed(k) over at the end of each video frame k. The output from the hold register 252 is also coupled to the dividend input of a fourth divider 283 whose division input is coupled to the Ce(k) output of the scale factor generator 264 to thereby generate an elevation error value Ee(k) once at the end of each video frame k.

Figure 3:
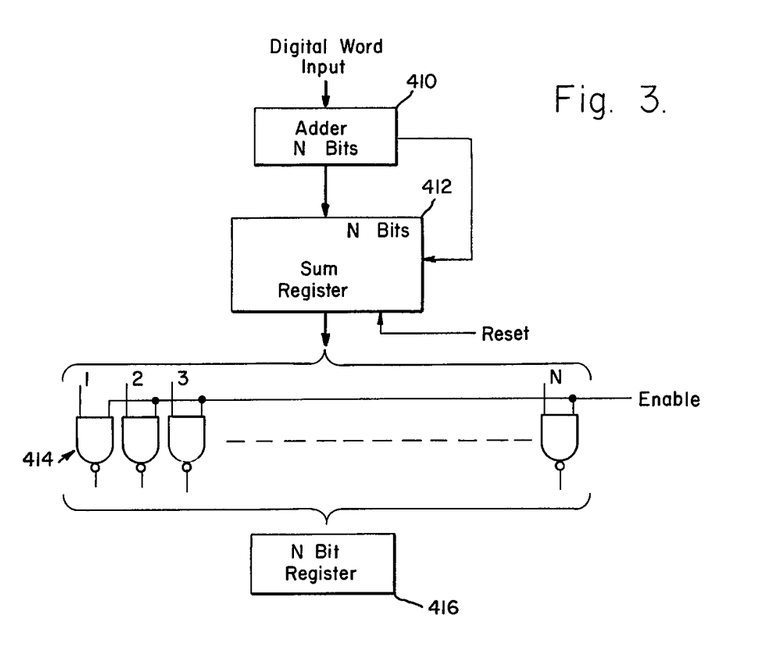
FIG. 3 illustrates one possible implementation of the accumulative adder and sample and hold portions of the correlation tracker illustrated in FIG. 2.
Figure 4:
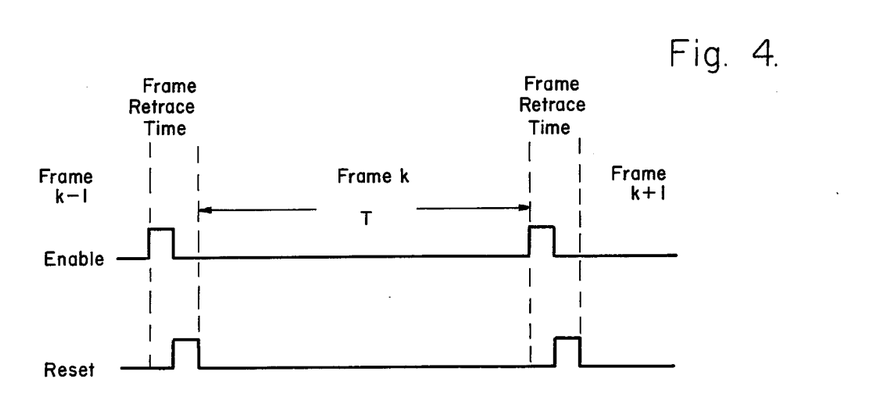
FIG. 4 is a representative timing diagram illustrating the operation of the accumulative adder and sample and hold implementation illustrated in FIG. 3.

The accumulative adder, switch apparatus and hold register referred to above for Ee(k) and Ed(k) may be implemented as shown in FIG. 3. In accordance with FIG. 3, N-bit digital words are sequentially inputted to an N-bit adder 410 from, for example, second or fourth multipliers 238 or 242 (FIG. 2a) where each such word value is added to the results stored in a sum register 412. The resultant sum is then stored in the sum register 412 and is added to the next N-bit word received by the adder 410. This sequence continues for each pixel in the video frame. During the frame retrace time, an enable signal (see FIG. 4) is generated and coupled to a plurality of AND gates 414 comprising the switch apparatus, represented, for example, by switches 246 and 250 in FIG. 2a, whereby one AND gate input is coupled to one sum register output. Thus, when the enable signal occurs, the accumulated value held in the sum register at the end of each video frame k will be transferred through the switch apparatus 414 to an N-bit hold register 416. Of course, it will be appreciated that many other accumulative adding and sampling techniques may be devised and that it will be possible in some embodiments to eliminate the hold register 416 if subsequent calculations are completed immediately during the frame retrace time.

The present invention also incorporates a scale factor generator 264 to generate adaptive scale factors to provide the correlation error signals in accordance with the teachings of the present invention. These adaptive scale factors Ce(k) + Cd(k) are defined to be the negative of the second derivative of the cross correlation function between the reference map and the scene in the $\epsilon$ and $\eta$ coordinate directions as defined in FIG. 1a respectively. It can be shown that these adaptive scale factors may be generated according to the relationships:

$$C_e(k) = \sum_{i=1}^{Ne} \sum_{j=1}^{Nd} We_{ij}^2(k)$$

$$C_d(k) = \sum_{i=1}^{Ne} \sum_{j=1}^{Nd} Wd_{ij}^2(k).$$

In addition, the resulting correlation error values Ee(k) + Ed(k) may incorporate undesirable cross-coupling which may be removed utilizing the cross-coupling scale factor Ced(k) which may be generated in the scale factor generator according to the relationship:

$$C_{ed}(k) = \sum_{i=1}^{Ne} \sum_{j=1}^{Nd} We_{ij}(k) Wd_{ij}(k)$$

where Ced(k) is the negative of the cross partial second derivative of the cross correlation function between the reference map and the incoming scene in the $\epsilon$ and $\eta$ coordinate directions. It will be appreciated that other methods and apparatus for defining values for Ce(k) and Cd(k) may be devised without departing from the teaching of the present invention and that cross-coupling need not necessarily be removed in all embodiments and that Ced(k) may not have to be generated.

Referring again to FIG. 2a, adaptive scale factor Ce(k) may be generated by first squaring $We_{ij}$ by coupling the output of the first divider 231 to both inputs of a fifth multiplier 254. The output of the fifth multiplier 254 is then coupled to a third accumulative adder 256 whose output is coupled to a switch apparatus 258 and hold register 260 in the manner previously described in conjunction with the generation of correlation error signals $E_e(k)$ and $E_d(k)$. The transfer from the accumulative adder 256 to the hold register 260 will preferably occur during each frame retrace time and the value so transferred and held in the hold register 260 will be Ce(k).

Similarly, $Wd_{ij}$ is squared by coupling the output of the second divider 235 to both inputs of a sixth multiplier 262 whose output is coupled to a fifth accumulative adder 266 which in turn is coupled to a switch apparatus 268 and hold register 270 in the manner previously described to generate the adaptive scale factor Cd(k) once at the end of each frame k. Finally, weighting function $Wd_{ij}(k)$ is multiplied by $We_{ij}(k)$ in a sixth multiplier 272 whose inputs are respectively coupled to the second divider 235 and the first divider 231 with the output of the sixth multiplier 272 accumulatively added over all the pixels in a fourth accumulative adder 274. The output of the fourth accumulative adder 274 is coupled to a fourth switching apparatus 276 and a fourth hold register 278 in the manner previously described to thereby output the adaptive cross coupling scale factor Ced(k) during the frame retrace time.

Referring again to FIGS. 3 and 4, once the accumulated value over the video frame has been transferred to the various hold registers or otherwise utilized as required in subsequent calculations, an accumulator reset pulse may be generated by external timing circuitry (not shown) to reset each of the accumulative adders 240, 244, 256, 266 and 276 to zero during the frame retrace time in preparation for accumulating the data for the next video frame.

Correlation error signals free of cross-coupling for both the elevation and azimuth channels are next calculated in a normalized error signal generator 280 according to the relations $$\delta e' = \frac{1}{1 - \frac{Ced^2}{CeCd}} Ee'$$

where $$Ee'(k) = [Ee(k) - \frac{Ced(k)}{Ce(k)} Ed(k)]$$

and $$\delta d' = \frac{1}{1 - \frac{Ced^2}{CeCd}} Ed'$$

$$Ed'(k) = Ed(k) - \frac{Ced(k)}{Cd(k)} Ee(k)$$

Referring to FIG. 2b, the cross-coupling-free or normalized correlation error values $\delta e'(k)$ and $\delta d(k)$ may be calculated immediately upon receiving the adaptive scale factors for a particular frame. Thus, it is preferable to compute $\delta e'(k)$ and $\delta d'(k)$ during the frame retrace time $t_f$. As a representative example of one implementation, Ced(k) and Ce(k), the outputs from fifth hold register 278 and third hold register 260, may be coupled to a fifth divider 302 to generate the quotient Ced(k)/Ce(k) at the output of the fifth divider 302. Similarly, the output from the fifth hold register 278 where the value of Ced(k) for frame k is available and the output from the fourth hold register 270 where the value Cd(k) for frame k is available may be coupled to a sixth divider 300 to obtain the quotient Ced(k)/Cd(k).

The outputs of the fifth divider 302 (Ced/Cd) and the third divider 284 (Ed) are then coupled to the inputs of an eighth multiplier 290 to obtain the quotient (Ced/Cd)Ed. The output of the eighth multiplier 290 is coupled to the minus input of a fifth summer 292 whose other plus input is coupled to the output of fourth divider (Ee) to generate the azimuth cross-coupling-free correlation error signal Ed'(k) at the output of the fifth summer 292.

Similarly, the output of the sixth divider 300 (Ced/Cd) and the output from the fourth divider 282 (Ee) are coupled to and multiplied in a ninth multiplier 286 whose output is coupled to the minus input of a sixth summer 288. The positive input of the sixth summer 288 is coupled to the output of the third divider 284 (Ed) to thereby subtract the output of the ninth multiplier 286 from the elevation correlation error signal Ee and generate the elevation correlation error signal Ee'(k). The remaining term $1 - (Ced^2/CeCd)$ to complete the generation of the normalized correlation error signals $\delta e'$ and $\delta d'$ may be implemented as shown in FIG. 2b where the outputs from the fifth and sixth dividers 302 and 300 are coupled to and combined in a tenth multiplier 294 to generate the value $Ced^2(k)/Ce(k)Cd(k)$. The output from the tenth multiplier 294 is then coupled to the positive input of a seventh summer 296 which has negative input coupled to a ROM (read-only-memory) or other storage device 298 containing the constant 1 to obtain the result $1 - (Ced^2/CeCd)$ at the output of the seventh summer 296. The output of the seventh summer 296 is then coupled to the divisor inputs of a seventh divider 308 and an eighth divider 310 whose dividend inputs are respectively coupled to the outputs of the fifth summer and the sixth summer respectively to generate $\delta e'$ and $\delta d'$ respectively at the outputs of the seventh and eighth dividers 308 and 310 respectively.

Although the normalized correlation error signals $\delta e'(k)$ and $\delta d'(k)$ would be the desired tracking errors in an ideal case in which the reference map is not a function of past tracking errors, in reality the reference map may be significantly different from the ideal case because the reference map is in fact a function of past tracking errors. Consequently, the current tracking estimates $\delta e'(k)$ and $\delta d'(k)$ include the effects of past tracking errors. This undesirable corruption has been referred to as drift. However, it has been determined, in accordance with the present invention, that drift compensation can be incorporated to generate drift-free correlation error signals $\delta d_{corr}$ in azimuth and $\delta e_{corr}$ in elevation for each time frame k according to the relationships:

$$\delta e_{corr}(k) = [\delta_d'(k) + \delta d_{DR}(k)]$$
$$\delta e_{corr}(k) = [\delta_e'(k) + \delta e_{DR}(k)]$$

where the drift compensation terms are calculated recursively such that $$\delta e_{DR}(k) = \delta e_{DR}(k-1) + w_1 \delta_e'(k-1)$$

and $$\delta d_{DR}(k) = \delta d_{DR}(k-1) + w_1 \delta_d'(k-1).$$

The drift compensation terms $\delta e_{DR}(k)$ and $\delta d_{DR}(k)$ may be generated in a drift compensation means 331 utilizing the drift compensation terms $\delta e_{DR}(k-1)$ and $\delta d_{DR}(k-1)$ and the normalized error values $\delta e'(k-1)$ and $\delta d'(k-1)$ from the previous video frame $k-1$. Thus, in frame k the drift compensation terms and $\delta e_{DR}'(k)$ and $\delta d_{DR}'(k)$ are computed and held for use in the next frame $k+1$. This function may be performed to generate $\delta e_{corr}(k)$ by coupling the output from the seventh divider 308 ($\delta e'(k)$) to a first drift multiplier 312 where $\delta e'(k)$ is multiplied by $w_1$ where $w_1$ is a constant whose value is defined as previously described. The value of $w_1$ may be input from an external ROM indicated as box 313 or any other storage means. The output of the first drift multiplier 312 is coupled to one input of an eighth summer 314 whose output is coupled to a sixth sampling means 316 which may be a series of AND gates enabled once during each frame retrace time in the manner previously described in conjunction with FIGS. 3 and 4. The result is then held in a sixth hold register 318 for at least one frame time T. The output of the sixth hold register 318 for frame k is $\delta e_{DR}(k)$ which is coupled in a closed loop positive feedback manner to the second input of the eighth summer 314 so that the value at the output of the eighth summer 314 during frame k is the elevation drift compensation term for frame $k+1$ i.e., $\delta e_{DR}(k+1)$. The output of the sixth hold register 318 is also coupled to one input of a ninth summer 320 whose other input is coupled to the output of the third divider to thereby generate the sum $\delta d'(k) + \delta d_{DR}(k)$ at the output of the ninth summer 320 to produce the desired drift compensated correlation error signal $\delta d_{corr}(k)$.

Similarly, in the azimuth channel, the output from the ninth divider 310 is coupled to a second drift multiplier 324 and to the ROM 313 to generate the term $w_1*\delta d'(k)$. The output of the fourth constant multiplier 324 is coupled to the input of a tenth summer 326 whose output is in turn coupled to a seventh switch apparatus 328 which may be a series of AND gates periodically enabled during the frame retrace time to thereby transfer the result from the tenth summer 326 to a seventh hold register 330. The value held at the output of the seventh hold register 330 is thus $\delta d_{DR}(k)$ which is coupled to the second input of the tenth summer 326 so that the value $\delta d_{DR}(k+1)$ occurs as the output of the tenth summer 326 during the frame retrace time at the end of frame k. The output $\delta e'(k)$ from the eighth divider 310 is also coupled to one input of an eleventh summer 332. The second input of the eleventh summer 332 is coupled to the output of the seventh hold register 330 to thereby produce the result $\delta e'(k) + \delta e_{DR}(k) = \delta e_{corr}$ at the output of the eleventh summer 332.

The resultant correlation tracker error signals are useful in numerous applications including the elimination of jitter in the display as well as for providing pointing accuracies which permit accurate location of features in the field of view observed.

The various multipliers, dividers, registers, switching apparatus and summers referred to previously may be any of a number of conventional and available devices well known in the art.

While the above description has been made with reference to a digital system, it will be appreciated that various other implementations of the basic principles of the present invention are possible including an analog implementation or a hybrid implementation. The scope of the invention may thus include any suitable digital or analog processor arrangement that incorporates the principles in accordance with the invention. It will also be appreciated that other methods may be utilized to generate a reference map including external generation without direct utilization of the video signal $V_{ij}(k)$ and that orthogonal derivatives relative to a particular pixel may be derived in numerous other ways well known in the art without departing from the spirit of the present invention. In addition, it will be appreciated that in certain cases, drift removal or cross-coupling corrections may not be required and therefore drift removal apparatus and cross-coupling apparatus could be eliminated.

What is claimed is:

1. A correlation tracker for generating correlation tracking error signals said tracker having a receiver for receiving electromagnetic information from a scene to form an input signal having a plurality of sets of pixel values each set representing pixel data for one video frame, said correlation tracker comprising:
    (a) a reference map generator for receiving said pixel values and generating a reference map having a plurality of reference map values corresponding to said pixel values;
    (b) a weighting function generator coupled to said map generator for generating at least one weighting value for each pixel value;
    (c) a scale factor generator coupled to said weighting function generator for combining the weighting values to form at least one pixel correlation scale factor and accumulating said pixel correlation scale factors to form at least one correlation scale factor for each video frame; and
    (d) a correlation error signal generator coupled to said weighting function generator, to said scale factor generator, and to said map generator for generating at least one correlation error value from said reference map pixel values, said input signal pixel values, and said weighting function for each pixel and accumulating a plurality of said correlation error values which is scaled by one of said scale factors to form at least one correlation error signal for each video frame.

2. The correlation tracker of claim 1 further comprising a normalized error signal generator coupled to said scale factor generator and said correlation error signal generator whereby the value of said correlation error signal generated each video frame is multiplied by a function of said correlation scale factors to form at least one normalized correlation tracking error signal for each video frame.

3. The correlation tracker of claim 2 further comprising a drift compensator coupled to said normalized error signal generator and oriented to correct said normalized video error signals for one video frame as a function of the normalized video error signals from at least one prior video frame to generate at least one drift-free correlation tracker error signal for each video frame.

4. A correlation tracker for generating correlation tracking error signals said tracker having a receiver for receiving electromagnetic energy from an observed scene and generating therefrom a video signal $V_{ij}(k)$ useful in sequentially energizing a plurality of pixels $P_{ij}(k)$ on a display to sequentially form a plurality of frames of the observed scene thereon, said correlation tracker comprising:
    (a) a map generator for receiving said video signal $V_{ij}(k)$ for each pixel identified by an i location along a first direction and a j location along a second direction in each video frame k and recursively calculating a reference map $MAP_{ij}(k)$ according to the relation $$MAP_{ij}(k) = (1-w_1)MAP_{ij}(k-1) + w_1 V_{ij}(k)$$

where $w_1$ is a weighting value having a value $0 \leq w_1 \leq 1$, said map generator including memory means for storing at least one frame plus one line of $MAP_{ij}$ pixel data;
    (b) a weighting function generator coupled to said map generator memory means for generating a first weighting function $We_{ij}(k)$ and a second weighting function $Wd_{ij}(k)$ said first weighting function being a measure of the negative derivative of said reference map in said first direction and said second weighting function being a measure of the negative derivative of said reference map in said second direction;
    (c) a scale factor generator coupled to said weighting function generator for calculating a first adaptive scale factor $Ce(k)$ and a second adaptive scale factor $Cd(k)$ for each video frame k where said first and second scale factors are measures of the negative second derivative of the reference map in said first and second directions respectively; and
    (d) a correlation error signal generator coupled to said weighting function generator and to said map generator for generating a first correlation error value $Ee(k)$ according to the relationship $$Ee^*(k) = \sum_{i=1}^{Ne} \sum_{j=1}^{Nd} We_{ij}(k) [V_{ij}(k) - MAP_{ij}(k-1)]$$

$$Ee(k) = \frac{Ee^*(k)}{Ce(k)}$$

and a second correlation error value Ed(k) according to the relationship $$Ed^*(k) = \sum_{i=1}^{Ne} \sum_{j=1}^{Nd} Wd_{ij}(k) [V_{ij}(k) - MAP_{ij}(k-1)]$$

$$Ed(k) = \frac{Ed^*(k)}{Cd(k)}.$$

5. The correlation tracker of claim 4 wherein said scale factor generator further comprises means for generating a cross-coupling scale factor Ced(k) where said cross-coupling scale factor is a measure of the negative of the cross-partial second derivative of the cross-correlation function between the reference map and the observation scene.

6. The correlation tracker of claim 5 wherein said scale factors Ce(k), Cd(k) and Ced(k) are generated according to the relation:

$$Ce(k) = \sum_{i=1}^{Ne} \sum_{j=1}^{Nd} We_{ij}^2$$

$$Cd(k) = \sum_{i=1}^{Ne} \sum_{j=1}^{Nd} Wd_{ij}^2$$

$$Ced(k) = \sum_{i=1}^{Ne} \sum_{j=1}^{Nd} We_{ij} Wd_{ij}$$

where Ne is the total number of pixels to be correlated along the first direction and Nd is the total number of pixels to be correlated along the second direction.

7. The correlation tracker of claim 4 wherein said weighting functions are generated according to the relationship $$We_{ij}(k) = \frac{MAP_{i+1,j}(k-1) - MAP_{i-1,j}(k-1)}{2\Delta e}$$

$$Wd_{ij}(k) = \frac{-MAP_{i,j+1}(k-1) + MAP_{i,j-1}(k-1)}{2\Delta d}$$

where $\Delta e$ and $\Delta d$ are the respective dimensions of the pixels of said display along said first and second directions.

8. The correlation tracker of claim 4 further comprising a normalized error signal generator coupled to said scale factor generator and said correlation error signal generator whereby a first normalized error signal $\delta e'(k)$ is generated for frame k according to the relationship $$\delta e'(k) = \frac{1}{1 - \frac{Ced^2}{CeCd}} Ee'(k)$$

where $$Ee'(k) = Ee(k) - \frac{Ced(k)}{Ce(k)} Ed(k)$$

and a second normalized error signal $\delta d(k)$ is generated for frame k according to the relationship $$\delta d'(k) = \frac{1}{1 - \frac{Ced^2}{CeCd}} Ed'$$

$$Ed'(k) = Ed(k) - \frac{Ced(k)}{Cd(k)} Ee(k).$$

9. The correlation tracker of claim 4 wherein $1/w_1$ is defined to be the number of frames of video input $v_{ij}(k)$ which is effectively averaged in the reference map $MAP_{ij}(k)$.

10. The correlation tracker of claim 4 wherein the initial reference map is $MAP_{ij}(1/w_1)$ and is generated recursively according to the relation $$MAP_{ij}(k) = (1-w_1) MAP_{ij}(k-1) + w_1 V_{ij}(k)$$

for $1 \leq k \leq 1/w_1$ where $1/w_1$ is an integer equal to the number of frames over which $V_{ij}(k)$ is effectively averaged in the reference map $MAP_{ij}(k)$.

11. The correlation tracker of claim 4 wherein the map generator memory means comprises a register means for storing the most recently generated (Ne+1) × Nd pixel values of the reference map $MAP_{ij}$ in frames K−1 and k.

12. The correlation tracker of claim 4 wherein the map generator memory means comprises a random access memory for storing the most recently generated (Ne+1) × Nd pixel values of the reference map $MAP_{ij}$ in frames k−1 and k.

13. The correlation tracker of claim 4 further comprising a normalized error signal generator coupled to said scale factor generator and said correlation error signal generator whereby a first normalized error signal $\delta e'(k)$ is generated for frame k according to the relationship $$\delta e'(k) = \frac{1}{1 - \frac{Ced^2}{CeCd}} Ee'$$

where $$Ee'(k) = Ee(k) - \frac{Ced(k)}{Ce(k)} Ed(k)$$

and a second normalized error signal $\delta d(k)$ is generated for frame k according to the relationship $$\delta d'(k) = \frac{1}{1 - \frac{Ced^2}{CeCd}} Ed'$$

$$Ed'(k) = Ed(k) - \frac{Ced(k)}{Cd(k)} Ee(k).$$

14. The correlation tracker of claim 13 further comprising a drift compensator coupled to said normalized error signal generator for generating a first essentially drift-free video error signal $\delta e_{corr}(k)$ according to the relation $$\delta e_{corr}(k) = [\delta e'(k) + \delta e_{DR}(k)]$$

where $\delta e_{DR}(k)$ is recursively generated according to the relation $$\delta e_{DR}(k) = \delta e_{DR}(k-1) + w_1 \delta e'(k-1)$$

and a second substantially drift-free video error signal $\delta d_{corr}(k)$ according to the relation $$\delta d_{corr}(k) = [\delta d'(k) + \delta d_{DR}(k)]$$

where $\delta d_{DR}(k)$ is recursively generated according to the relation $$\delta d_{DR}(k) = \delta d_{DR}(k=1) + w_1 \delta d'(k-1).$$

15. The correlation tracker of claim 14 wherein the map generator memory means comprises a register means for storing the most recently generated (Ne+1) + Nd pixel values of the reference map $MAP_{ij}$ in frames $k-1$ and k.

16. The correlation tracker of claim 14 wherein the map generator memory means comprises a random access memory for storing the most recently generated (Ne+1) × Nd pixel values of the reference map $MAP_{ij}$ in frames $k-1$ and k.

17. The method of generating correlation tracking error signals from input electromagnetic video signals $V_{ij}(k)$ utilized to form one video frame k of a two-dimensional image plane having coordinates $(\epsilon,\eta)$ where $\epsilon$ represents the elevation and $\eta$ represents the azimuth said image plane defined by a plurality of pixels each having a discrete location (i,j) in the image plane along coordinates $\epsilon$ and $\eta$ respectively, said method comprising the steps of:

(a) generating a reference map value for each pixel according to the relation $$MAP_{ij}(k) = (1-w_1) MAP_{ij}(k-1) + w_1 V_{ij}(k)$$

where $w_1$ is a weighting value having a value $0 \leq w_1 \leq 1$, (b) storing at least one frame plus one line of reference map values $MAP_{ij}$;

(c) generating a first optimal weighting function $We_{ij}(k)$ according to the relation $$We_{ij}(k) = \frac{MAP_{i+1,j}(k-1) - MAP_{i-1,j}(k-1)}{2\Delta e}$$

where $\Delta e$ is the dimension of each pixel in said image along the $\epsilon$ coordinate;

(d) generating a second weighting function $Wd_{ij}(k)$ according to the relation $$Wd_{ij}(k) = \frac{-MAP_{i,j+1}(k-1) + MAP_{i,j-1}(k-1)}{2\Delta d}$$

where $\Delta d$ is the dimension of each pixel in said image plane along the $\eta$ coordinate;

(e) generating first, second and third adapative scale factors for each image plane frame according to the relationships $$Ce(k) = \sum_{i=1}^{Ne} \sum_{j=1}^{Nd} We_{ij}^2(k)$$

$$Cd(k) = \sum_{i=1}^{Ne} \sum_{j=1}^{Nd} Wd_{ij}^2(k)$$

$$Ced(k) = \sum_{i=1}^{Ne} \sum_{j=1}^{Nd} Wd_{ij}(k) We_{ij}(k)$$

where Ne is the maximum number of pixels along the $\epsilon$ coordinate and Nd is the maximum number of pixels along the $\eta$ coordinate; and (f) generating first and second correlation error signals Ee(k) and Ed(k) for each image plane frame accordingly to the respective relationships $$Ee(k) = \frac{1}{Ce(k)} \sum_{i=1}^{Ne} \sum_{j=1}^{Nd} We_{ij}(k) [V_{ij}(k) - MAP_{ij}(k-1)]$$

$$Ed(k) = \frac{1}{Cd(k)} \sum_{i=1}^{Ne} \sum_{j=1}^{Nd} Wd_{ij}(k) [V_{ij}(k) - MAP_{ij}(k+1)].$$

18. The method of claim 17 comprising the further step of generating first and second normalized correlation error signals $\delta e'(k)$ and $\delta d'(k)$ for each image plane frame k according to the respective relationships $$\delta e'(k) = \frac{1}{1 - \frac{Ced^2(k)}{Ce(k)Cd(k)}} [Ed(k) - \frac{Ced(k)}{Ce(k)} Ed(k)]$$

$$\delta d'(k) = \frac{1}{1 - \frac{Ced^2(k)}{Ce(k)Cd(k)}} [Ed(k) - \frac{Ced(k)}{Cd(k)} Ee(k)].$$

19. The method of claim 17 wherein $1/w_1$ is defined to be the number of frames over which $V_{ij}(k)$ is effectively averaged to generate the reference map values $MAP_{ij}(k)$.

20. The method of claim 17 wherein the initial reference map is defined to be $MAP_{ij}(1/w_1)$ and is generated recursively according to the relation $$MAP_{ij}(k) = (1-w_1) MAP_{ij}(k-1) + w_1 V_{ij}(k)$$

for $1 \leq k \leq 1/w_1$ where $1/w_1$ is an integer equal to the number of frames over which $V_{ij}(k)$ is effectively averaged to generate the reference map values $MAP_{ij}(k)$.

21. The method of claim 17 further comprising the steps of compensating for drift in the $\epsilon$ coordinate direction to generate a first drift-free correlation error signal $\delta e_{corr}(k)$ according to the relation $$\delta e_{corr}(k) = [\delta e'(k) - \delta e_{DR}(k)]$$

where $\delta e_{DR}(k)$ is recursively generated according to the relation $$\delta d_{DR}(k) = \delta d_{DR}(k-1) + w_1 \delta d'(k-1)$$

and compensating for drift in the $\eta$ coordinate direction to generate a second drift-free video error signal $\delta d_{corr}(k)$ according to the relation $$\delta d_{corr}(k) = [\delta d'(k) + \delta d_{DR}(k)]$$

where $\delta d_{DR}(k)$ is recursively generated according to the relation $$\delta e_{DR}(k) = \delta e_{DR}(k-1) + w_1 \delta e'(k-1).$$

22. The method of claim 21 wherein $1/w_1$ is defined as the number of frames over which $V_{ij}(k)$ is effectively averaged to generate the reference map values $MAP_{ij}(k)$.

23. The method of claim 21 wherein the initial reference map is defined to be $MAP_{ij}(1/w_1)$ and is generated recursively according to the relation $$MAP_{ij}(k) = (1-w_1) MAP_{ij}(k-1) + w_1 V_{ij}(k)$$

for $1 \leq k \leq 1/w_1$ where $1/w_1$ is an integer equal to the number of frames over which $V_{ij}(k)$ is effectively averaged to generate the reference map values $MAP_{ij}(k)$.

24. The method of claim 23 further comprising the step of removing drift corruption from said correlation error values to form a first and a second drift-free correlation error signal.

25. The method of generating correlation tracking error signals from input electromagnetic video signals $V_{ij}(k)$ utilized to form one video frame k of a two-dimensional image plane having coordinates $(\epsilon,\eta)$ where $\epsilon$ represents the elevation and $\eta$ represents the azimuth said image plane defined by a plurality of pixels each having a discrete location (i,j) in the image plane along coordinates $\epsilon$ and $\eta$ respectively, said method comprising the steps of:
 (a) providing a reference map value $MAP_{ij}$ for each pixel representative of previous electromagnetic signals $V_{ij}(k)$;
 (b) storing at least one frame and one line of reference map values $MAP_{ij}$;
 (c) generating first and second weighting functions representative of the negative derivative of the reference map values in the $\epsilon$ and $\eta$ coordinate directions respectively;
 (d) generating first and second adaptive scale factors said adaptive scale factors being representative of the negative second derivative of the reference map in the $\epsilon$ and $\eta$ coordinate directions respectively, between the reference map pixels and the video signal pixels summed over all pixels of said image plane;
 (e) generating correlation error signals along said $\epsilon$ and $\eta$ coordinates by generating the difference between the reference map pixel values and the video signal pixel values, multiplying that difference by the associated pixel weighting in said first coordinate direction to form a first set of error values and in said second coordinate direction to form a second set of error values, accumulating the members of said first set of error values over each video frame and dividing the result by said first adaptive scale factors to form a first correlation error value in said first coordinate direction and accumulating the members of said second set of error values over each video frame and dividing the result by said second adaptive scale factor to form a second correlation error value in said second coordinate direction.

26. The method of claim 25 further comprising the steps of:
 (a) generating an adaptive cross-coupling scale factor representative of the negative of the cross-partial second derivative in said first and second coordinate directions of the cross-correlation function between the reference map pixel values and video signal pixels summed over all pixels in said image plane; and
 (b) normalizing said first and second correlation error values utilizing said first and second adaptive scale factor and said adaptive cross-coupling scale factors to eliminate cross-coupling components between said first and second correlation error values to form first and second normalized error signals.

27. The method of claim 26 further comprising the step of removing drift corruption from said normalized error signals to form a first and a second drift-free normalized error signal.

* * * * *